Patented Apr. 1, 1924.

1,489,008

UNITED STATES PATENT OFFICE.

HARRY DE COURCY RICHARDS, OF SAN FRANCISCO, CALIFORNIA.

METHOD OF SEPARATING AND PURIFYING MINERALS.

No Drawing.    Application filed December 22, 1921. Serial No. 524,323.

*To all whom it may concern:*

Be it known that I, HARRY DE C. RICHARDS, citizen of the United States of America, and resident of San Francisco, in the State of California, have invented certain new and useful Methods of Separating and Purifying Minerals, of which the following is a specification.

My invention relates to the separation and purification of uncrystallized minerals.

The object of the invention is to provide a method for disintegrating, resolving, dissolving and separating amorphous, semi-amorphous and sedimentary mineral formations, such as kaolin, aluminum, magnesite, feldspathic silicious and other sedimentary or saline deposits, in a quick and definite manner and at low cost.

My process is based upon the discovery of the tendency of brine to disintegrate various mineral formations, and particularly the physical and complex chemical energy of sea water in attacking sedimentary minerals and formations that were laid down in saline or playa lakes, and is particularly applicable to the recovery of magnesia, $MgCO_3$, from magnesite or other mineral formations.

In carrying out the process, the mineral to be treated is preferably subjected to the action of the brine and may be subjected to agitation by mechanical, hydraulic or pneumatic action. Although separation will occur without agitation, it is greatly facilitated by agitation, thus enabling the brine to quickly attack the particles. By forcing air or water under pressure into the resolved or dissolved mineral, the various ingredients will separate by gravitation and may be taken off at various depths and dried or further treated. The material may be relieved of the brine, if desirable, by being washed in fresh water.

As already pointed out, the process is particularly applicable for the treatment of amorphous magnesite, which may have questionable or no value, from an over plus of silica, calcium, iron or other material. By grinding the magnesite to desirable fineness and triturating with brine of suitable strength, the carbonates of magnesia will separate from the calcium and silica and may be floated off in more or less flocculent form and of definite purity.

An ideal location for a plant is at a point where sea water is available to pump up to mix with the mineral, after which the mixture may be agitated until the various ingredients have separated in the agitated solution according to their respective specific gravities, whereupon the minerals may be floated off or tapped at such depths as desirable and subjected to further treatment. The sediments or tails may be drawn off and treated further, chemically or/and mechanically, for desirable by-products. The action of the sea-water is mostly physical, disintegrating certain deposits of magnesite entirely and effectively at very low cost. There is slight but valuable chemical action. The separation after the disintegration by the sea-water is entirely mechanical.

By my process I am enabled to separate and purify uncrystallized commercial minerals in a simpler, quicker and more economical manner than heretofore possible, and without the necessity for subjecting the minerals to be treated to calcining or other preliminary treatment. Moreover, my process does not involve costly installations or chemical treatments. The process also enables making any desirable percentage combinations of contained ingredients.

Having now particularly described the nature of my invention and the general modus operandi, what I claim is:

1. The method of obtaining magnesium from magnesite, comprising subjecting the magnesite in undecomposed condition to the disintegrating action of sea water, whereby to cause the carbonate of magnesium to separate from the calcium and silica, and drawing off said carbonate of magnesium from the solution.

2. The method of obtaining magnesium from magnesite, comprising subjecting the magnesite in undecomposed condition to the disintegrating action of sea-water, then agitating the solution by injecting water under pressure into it to cause the impurities to separate by gravity from the carbonate of magnesium and then drawing off the said carbonate of magnesium from the solution.

3. The method of treating amorphous, semi-amorphous and sedimentary mineral formations, comprising subjecting the mineral to be treated and containing magnesite in undecomposed condition to the disintegrating action of sea water, then agitating the solution by injecting water under pressure into it to cause the impurities to separate by gravity from the desirable carbonate and then drawing off the carbonate from the solution.

4. The method of obtaining magnesium from magnesite bearing mineral formations comprising subjecting such material formations containing magnesite in undecomposed condition to the disintegrating action of sea water, whereby to cause the carbonate of magnesium to separate from the calcium and silica and then drawing off said carbonate of magnesium from the solution.

5. The method of treating amorphous, semi-amorphous and sedimentary mineral formations, comprising subjecting the mineral to be treated and containing magnesite in undecomposed condition to the disintegrating action of sea water, then agitating the solution by injecting water under pressure into it to cause the impurities to separate by gravity from the desirable carbonate and then drawing off such carbonate from the solution.

6. The method of obtaining magnesium from magnesite bearing mineral formations comprising subjecting such mineral formations containing magnesite in undecomposd condition to the disintegrating action of sea water, whereby to cause the carbonate of magnesium to separate from the calcium and silica and then separating said carbonate of magnesium from the solution.

7. The method of treating amorphous, semi-amorphous and sedimentary mineral formations, comprising subjecting the mineral to be treated and containing an alkali earth carbonate to the disintegrating action of sea water, then agitating the solution by injecting water under pressure into it to cause the impurities to separate by gravity from the desirable carbonate and then drawing off the carbonate from the solution.

8. The method of treating amorphous, semi-amorphous and sedimentary mineral formations comprising subjecting the mineral to be treated and containing an alkali earth carbonate to the disintegrating action of sea water, then agitating the solution by injecting water under pressure into it to cause the impurities to separate by gravity from the desirable carbonate and then drawing off such carbonate from the solution.

9. The method of treating amorphous, semi-amorphous and sedimentary mineral formations, comprising subjecting the mineral to be treated and containing an alkali earth carbonate to the disintegrating action of a solution containing a substantial amount of sodium chloride, then agitating the solution by injecting water under pressure into it to cause the impurities to separate by gravity from the desirable carbonate and then drawing off the carbonate from the solution.

10. The method of treating amorphous, semi-amorphous and sedimentary mineral formations comprising subjecting the mineral to be treated and containing an alkali earth carbonate to the disintegrating action of a solution containing a substantial amount of sodium chloride, then agitating the solution by injecting water under pressure into it to cause the impurities to separate by gravity from the desirable carbonate and then drawing off such carbonate from the solution.

11. The method of obtaining magnesium from magnesite, comprising subjecting the magnesite in undecomposed condition to the disintegrating action of a solution containing a substantial amount of sodium chloride, whereby to cause the carbonate of magnesium to separate from the calcium and silica, and drawing off said carbonate of mgnesium from the solution.

12. The method of obtaining magnesium from magnesite bearing mineral formations comprising subjecting such mineral formations containing magnesite in undecomposed condition to the disintegrating action of a solution containing a substantial amount of sodium chloride, whereby to cause the carbonate of magnesium to separate from the calcium and silica and then separating said carbonate of magnesium from the solution.

Signed at city and in the county of San Francisco and State of California, this 16th day of December, A. D. 1921.

HARRY DE COURCY RICHARDS.